United States Patent [19]

Katkov

[11] 4,256,211
[45] Mar. 17, 1981

[54] PISTON STROKE ADJUSTING ARRANGEMENT FOR DISC-TYPE FRICTION CLUTCHES AND BRAKES

[76] Inventor: Jury V. Katkov, 3 linia, 11, korpus 2, kv. 63, Moscow, U.S.S.R.

[21] Appl. No.: 55,281

[22] Filed: Jul. 6, 1979

Related U.S. Application Data

[63] Continuation of Ser. No. 810,288, Jun. 27, 1977, Pat. No. 4,176,738.

[30] Foreign Application Priority Data

Jun. 29, 1976 [SU] U.S.S.R. .............................. 2380121

[51] Int. Cl.³ .................... F16D 13/75; F01B 31/14; F15B 15/24
[52] U.S. Cl. ............................... 192/111 R; 92/13.41; 188/71.7; 188/196 V; 192/18 A; 411/535
[58] Field of Search ......... 85/50 A; 188/71.7, 196 M, 188/196 V; 192/18 A, 85 CA, 111 R; 92/13.4, 13.41, 13.6; 123/48 C

[56] References Cited

U.S. PATENT DOCUMENTS

| 1,360,366 | 11/1920 | Charter | 123/48 C |
| 1,435,433 | 11/1922 | Triggs | 85/50 A |
| 1,450,625 | 4/1923 | Alexander | 85/50 A |
| 2,759,582 | 8/1956 | Dehn | 192/18 A |

FOREIGN PATENT DOCUMENTS

| 1216034 | 5/1966 | Fed. Rep. of Germany | 192/111 R |
| 304372 | 6/1971 | U.S.S.R. | 192/18 A |

Primary Examiner—Allan D. Herrmann
Attorney, Agent, or Firm—Robert E. Burns; Emmanuel J. Lobato; Bruce L. Adams

[57] ABSTRACT

A piston stroke adjusting arrangement for disc-type friction clutches or brakes used most advantageously in forging machines and presses where rapid engagement and disengagement of clutches and brakes is essential. The arrangement includes a housing and a cylinder flange, fast with each other, the cylinder receiving the piston reciprocating therein. Axial displacement of the piston is limited by a washer arrangement in a groove made in the housing and having radially running recesses of different depths. The flange of the cylinder carries an abutment engageable in one of the radial recesses of the washer. The disclosed construction simplifies the structure of the arrangement, as a whole, and provides for both rapid and reliable adjustment of the piston stroke value.

2 Claims, 5 Drawing Figures

PISTON STROKE ADJUSTING ARRANGEMENT FOR DISC-TYPE FRICTION CLUTCHES AND BRAKES

This is a continuation of application Ser. No. 810,288 filed June 27, 1977 now U.S. Pat. No. 4,176,738

BACKGROUND OF THE INVENTION

The invention relates to disc-type friction clutches and brakes and, more particularly, it relates to arrangements for adjusting the stroke of the actuating piston in such clutches and brakes.

The invention can be used to utmost effectiveness in both the existing forging machines and presses and those being built, since rapidity of engagement and disengagement of the clutches and brakes in such machines and presses is essential.

More often than not the existing arrangements for adjusting the stroke of a piston include washers.

Two commonly known types of such arrangements are available. The first type is one including two washers of which the first, acting as the piston-washer, has stepped radially through recesses. The other washer likewise has stepped recesses so that this washer can be centered relative to the piston-washer by engagement of the external surface of the piston-washer with the internal surface of the stepped recesses of the second washer. Adjustment of the piston stroke value is effected by rotating one of the washers relative to the other one, which has proved to be a time-consuming operation. The washers are retained in an adjusted position with aid of a locking device of which one part is located on the external surface of the cylinder receiving the piston-washer, and the other part is carried by the second washer. The incorporation of the locking device complicates the structure of the entire apparatus. Moreover, sophisticated machinery is to be used in the manufacture of washers with stepped recesses.

The other type of adjusting arrangements includes a washer with radial recesses of different depths, accomodated between a housing and a flange of, a cylinder receiving a piston reciprocating therein, the housing and the cylinder being rigidly secured to each other, the stroke of the piston being limited by the washer (see, for example, Swiss Pat. No. 376,728, Cl. 47 c; 9, issued in 1964). In this last-described type of the arrangement adjustment of the piston stroke is carried out, similarly to the first-described type of the arrangement, by rotating the cylinder flange about its own axis, which brings about considerable difficulties in cases where the brake or the clutch are of large dimensions. Furthermore, the rotation of these bulky parts is a time-consuming operation. Moreover, in the last-described apparatus of the prior art bushes and bolts are incorporated to secure the washer to the housing, which complicates the structure of the arrangement, as a whole, and hampers the operations of mounting and removing the washer when the friction linings of the brake or of the clutch become worn out.

SUMMARY OF THE INVENTION

It is an object of the present invention to create a piston stroke adjusting apparatus which should speed up the adjustment process.

It is another object of the present invention to simplify the structure of the arrangement.

It is still another object of the present invention to provide for facilitated maintenance of the arrangement.

These and other objects are attained in a piston stroke adjusting arrangement for disc-type friction clutches and brakes, comprising a washer with a plurality of radial recesses of different depths, accomodated between a housing and a flange of a cylinder receiving therein a reciprocating piston, the housing and the flange being rigidly attached to each other, and the piston having its axial displacement limited by said washer, wherein, in accordance with the invention, the flange of the cylinder has mounted thereon an abutment having its width equalling that of one of the recesses of the washer, the latter being arranged in a groove provided in the housing.

The above specified structure of the arrangement provides for quick and reliable adjustment of the piston stroke in a clutch or a brake of any size. This has been made possible, owing to the adjustment abutment being situated in the area of the securing bolt and coaxially therewith, which obviates the need in additional bolts and bushes. Furthermore, the washer itself is received in the groove of the housing of the clutch or the brake, whereby the dimensions of the latter are reduced.

In accordance with a feature of the present invention, to speed up the adjustment, the abutment is spring-biased to be retained in an adjusted position. Preferably, the arrangement incorporates several such adjustment abutments, and the spring is adapted to retain the already adjusted abutment from eventual disengagement thereof from the washer, while the rest of the abutments are being adjusted.

As a rule, in friction clutches and in friction brakes several bolts are used to secure the flange of the cylinder to the housing, this necessitating provision of a plurality of the herein disclosed arrangements.

To facilitate the operation and maintenance of the herein disclosed arrangement, each washer is preferably shaped as a polyhedron, the width of the groove substantially equalling the spacing between the opposite faces of the washer.

Owing to this construction, all the arrangements situated diametrally of the clutch or of the brake are mutually oriented.

BRIEF DESCRIPTION OF THE DRAWINGS

The present invention will be better understood from the following description of an embodiment thereof, with reference being had to the accompanying drawings, wherein.

DESCRIPTION OF THE PREFERRED EMBODIMENT

Figure 1:
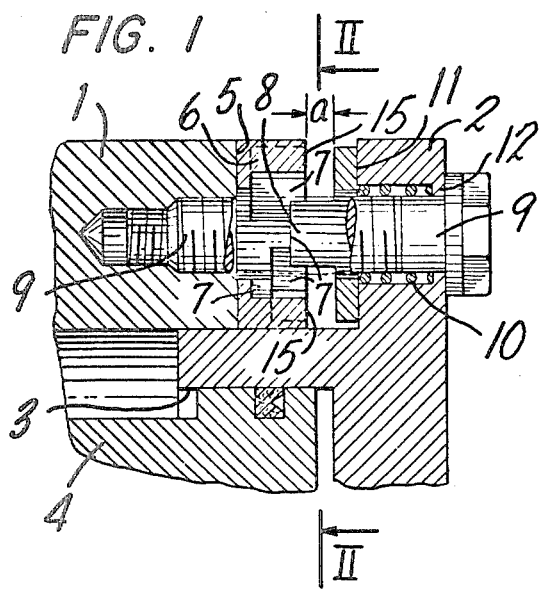
FIG. 1 is a longitudinal section view taken along section line I—I of FIG. 3 and illustrates a piston stroke adjusting arrangement embodying the present invention.

Referring now to the drawings, the arrangement embodying the present invention includes a housing 1 (FIG. 1) and a flange 2 of a cylinder 3 receiving therein a reciprocating piston 4, the housing 1 and the flange 2 being rigidly attached to each other. To provide for limiting the piston stroke, the housing 1 has made therein a groove 5 accomodating a washer 6 with radial recesses 7 of different depths. The flange 2 has mounted thereon an abutment 8 arranged coaxially with a bolt 9 which is one of the several bolts securing the housing 1 and the flange 2 of the cylinder 3 to each other. The abutment 8 is received in one of the radial recesses 7 and has a width equilling the width of this recess 7, for tight engagement of the abutment 8 and the washer 6. The abutment 8 is urged by a spring 10 which is a compression spring having one its end bearing against the end face 11 of the abutment 8 and its other end bearing against an annular shoulder 12 provided in the flange 2.

Figure 2:
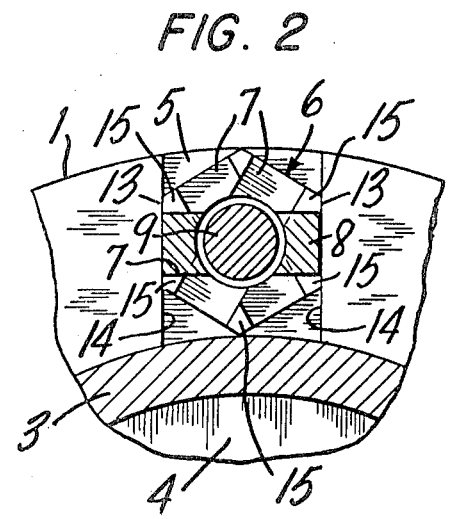
FIG. 2 is a section view taken along section line II—II of FIG. 1.
Figure 3:
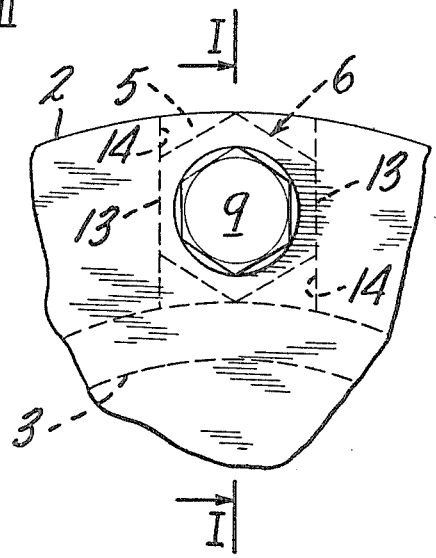
FIG. 3 is a fragmentary end view of the arrangement in FIG. 1.
Figure 4:
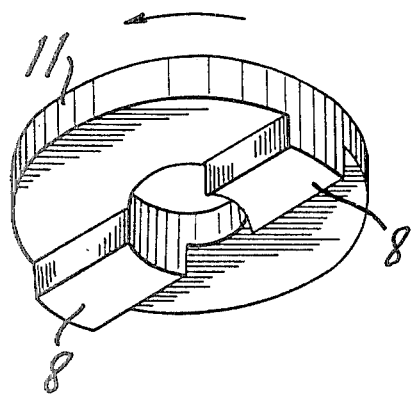
FIG. 4 is a perspective view of an abutment element in the arrangement according to the invention.
Figure 5:
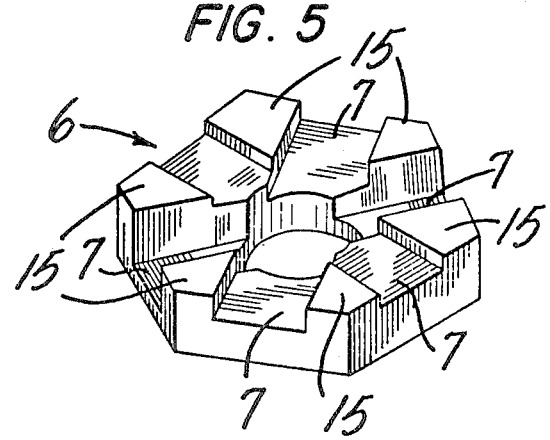
FIG. 5 is a perspective view of a washer in the arrangement shown in FIG. 1.

To retain the washer 6 against rotation in the groove 5 (FIG. 2), the washer 6 is shaped as a polyhedron, e.g. hexagon, having always its two opposite faces or sides 13 engaging the lateral sides 14 of the groove 5, i.e. the width of the groove 5 substantially equals the spacing of the opposite sides or faces 13 of the washer 6.

The washer 6 is additionally provided with lugs 15 retaining the abutment 8 in the adjusted position in the recesses 7 of the washer 6.

As a rule, the flange 2 of the cylinder 3 is secured to the housing 1 with a number of bolts 9; therefore, the same number of washers 6 and abutments 8 is preferably used for adjusting the stroke of the piston.

The herein disclosed arrangement is operated, as follows.

The bolt 9 is turned out from the housing 1 of the clutch or of the brake, as case may be, to an extent that, by having moved the flange 2 of the cylinder 3 in the bolt-loosening direction, the abutment 8 may be disengaged from the washer 6 against the effort of the compressed spring 10, and rotated about its own axis for the abutment part 8 thereof to be positioned to face a deeper recess 7 of the washer 6, i.e. the recess 7 which is different from the one selected at the initial adjustment. This done, the abutment 8 is moved toward the washer 6 to engage it in the now selected recess 7 of the washer 6. While the rest of the abutment 8 - washer 6 couples are being adjusted, the spring 10 retains the already adjusted couples, likewise including each an abutment 8 and the washer 6. Upon having adjusted in the same manner all the washer-abutment couples interposed between the housing 1 and the flange 2 of the cylinder 3, the flange 2, and hence, the entire cylinder 3, are moved for the flange 2 to engage the end face 11 of the abutment 8, whereafter all the bolts 9 are tightened.

Should it be necessary to remove the worn out friction members and install new ones, following the replacement, the washer-abutment couples are set at the position of the initial adjustment, with the abutment 8 engaging the most shallow recess 7 to provide for the gap "a" (see FIG. 1).

The herein disclosed arrangement makes additional fastening members unnecessary and enables to reduce the weight of the piston stroke adjustment means, as well as to make available but a few standard sizes of mass-produced washers to fit various types and dimensions of brakes and clutches.

Washers for arrangements of the herein disclosed kind can be produced by commonly used machines for cold punching or upsetting.

What is claimed is:

1. A piston stroke adjusting arrangement for disc-type brakes and clutches comprising, a cylinder housing having a radial groove on an end thereof having two opposed flat sides, a cylinder in said housing, a cylinder end cover closing an end of said cylinder, a bolt extending through said cover into said housing for removably securing the flange cover to said housing, a piston reciprocable in said cylinder, means for varying the clearance between the piston and the cover comprising at least one washer having a multiplicity of paired flat sides for locating it in said groove with opposite flat sides engaging the opposite flat sides of the groove to preclude rotation of said washer in said groove, said bolt extending axially through said washer, said washer having a plurality of alike radial recess of different depth extending radially of said bolt and coaxial therewith, an abutment member having a through opening through which said bolt extends axially, an abutment projection on a face of said abutment member received in a corresponding one of the recesses and rotational about said bolt for selective insertion into different corresponding ones of the recesses in said washer, said abutment projection having a cross section corresponding with the alike recesses for being received therein, wherein the clearance between the cover and the piston is varied in dependence upon into which recess of said abutment projection is received thereby to set the length of the stroke of said piston.

2. A piston stroke adjusting arrangement according to claim 1, in which said cover has a recess coaxial with said bolt and open to said abutment member, a spring in said recess about said bolt biasing said abutment toward said washer.

* * * * *